UNITED STATES PATENT OFFICE.

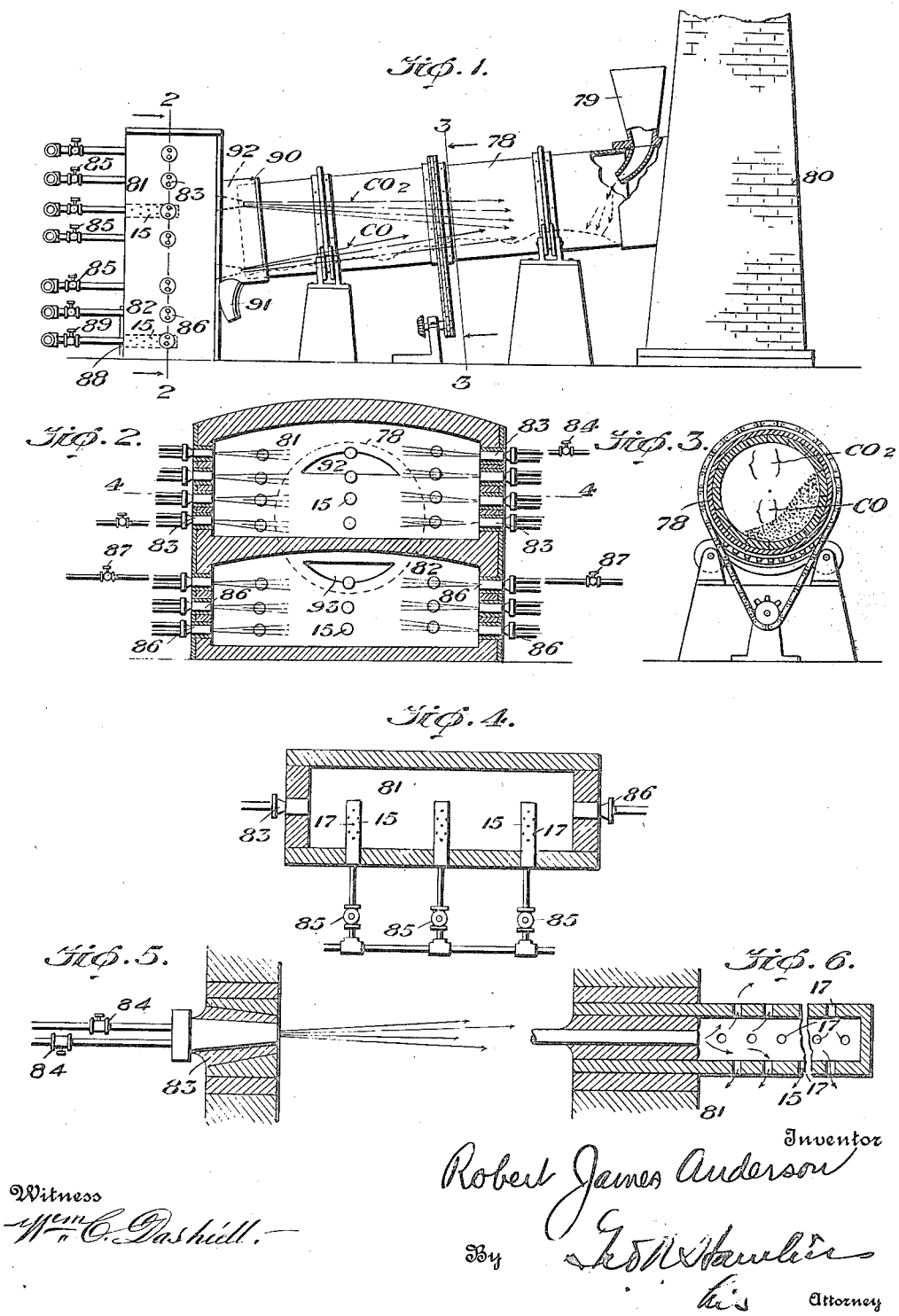

ROBERT JAMES ANDERSON, OF EL PASO, TEXAS, ASSIGNOR TO INTERNATIONAL FUEL CONSERVATION CO., OF PHOENIX, ARIZONA, A CORPORATION OF ARIZONA.

PROCESS FOR CONVERTING SODIUM SULFATE TO SODIUM SULFID.

1,397,497.     Specification of Letters Patent.    Patented Nov. 22, 1921.

Original application filed March 6, 1919, Serial No. 281,037. Divided and this application filed September 30, 1920. Serial No. 413,752.

*To all whom it may concern:*

Be it known that I, ROBERT JAMES ANDERSON, a citizen of the United States, residing at El Paso, in the county of El Paso and State of Texas, have invented certain new and useful Improvements in Processes for Converting Sodium Sulfate to Sodium Sulfid, of which the following is a specification.

This invention relates to processes for treating chemical compounds and, more particularly, for the conversion of sodium sulfate into sodium sulfid.

The present application is a division of my application for combustion processes, filed March 6, 1919, Serial No. 281,037.

The apparatus, means and elements described herein and disclosed in the accompanying drawings are set forth and claimed in my Patent No. 1,362,212, December 14, 1920, for combustion apparatus.

My process is susceptible of use in the treatment of various chemical compounds such as the manufacture of Portland cement, manufacture of glass, the conversion of sodium sulfate into sodium sulfid and the conversion of sodium sulfate into sodium oxid. The process finds particular usefulness in the conversion of sodium sulfate into either the sulfid or the oxid and the examples of the process hereinafter set forth and which are disclosed in the accompanying drawings pertain particularly thereto. I do not, however, limit the invention to practice of the process only in the conversion of sodium sulfate.

In the practice of the process for the manufacture of sodium sulfid or sodium oxid, there is employed an inclined tubular rotary furnace or kiln wherein the rotation of the furnace or kiln causes the sodium compound to continuously rise up the upwardly turning interior wall of the kiln or furnace and to fall vertically, while advancing steadily in the direction of the length of the furnace or kiln.

In the conversion of sodium sulfate to sodium sulfid, the chemical reactions and conversions are effected at a temperature of about 960° C., at which temperature the product becomes soft and pasty and in condition for conversion which can only be accomplished in the presence of excess carbon in the gases and not in an oxidizing temperature. If the temperature exceeds the critical point, the product becomes rapidly fused, liquefies and adheres to the sides of the furnace or kiln, forming sodium silicate by union with the furnace lining.

My process for the conversion of heavy chemicals, for instance sodium sulfate into sodium sulfid, contemplates the complete and accurate control of both the furnace temperatures and the condition of the gases.

Primary and secondary combustion processes are carried on in separate combustion chambers. The $CO_2$ gases from the secondary process are discharged into the end of the rotary furnace or kiln in such manner as to direct the flames of the reducing gases in close contact along the line and top of the advancing charge of the sodium sulfate at a time when the material has reached the temperature requisite for conversion into sodium sulfid. The conversion from sodium sulfate to sodium sulfid is almost instantaneous when contact is had with the carbon in the gases at proper temperatures. The constant discharge of the converted material makes the conversion process practically automatic and continuous.

The primary combustion process produces $CO_2$ gases which are utilized to heat the walls of the rotary furnace or kiln and, by radiation from these walls furnishing the interior of the rotary furnace or kiln with a flame of neutral heated gases insuring accurate, complete and definite control of the product and effecting economy in the use of fuel.

As a result of the specified application of the CO and $CO_2$ gases derived, respectively, from the secondary and primary combustion processes, there is a constant discharge of sodium sulfid from the delivery end of the rotary furnace or kiln and, consequently, a direct, automatic and continuous process of conversion of sodium sulfate into sodium sulfid is obtained. This obviates two troublesome and expensive steps formerly required, namely, leaching of the roasted product, decanting and settling the liquors; and, the second step of evaporation of the liquid solutions down to the finished commercial product.

In the practice of my process for the conversion of sodium sulfate into sodium oxid, the secondary combustion process providing CO gases, is not used. The $CO_2$ gases from the primary combustion chamber are so regulated that the complete combustion of the fuel for the purpose of liberating substantially all of the heat units is carried on and so regulated that an excess of oxygen is present in the furnace or kiln. In the production of sodium oxid, lime is added and the following reactions occur; the sulfur in the sodium sulfate leaves the sodium and combines with the lime for which it has a greater affinity and forms calcium sulfid, the excess oxygen furnished the $CO_2$ gases being present in sufficient quantities to unite with the sodium to form sodium oxid.

For the purpose of obtaining CO and $CO_2$ gases for use in converting sodium sulfate to sodium sulfid, my process may employ the secondary and primary combustion processes, which are set forth and claimed in my application filed March 6, 1919, Serial No. 281,037, for combustion processes and the apparatus used for that purpose may be that which is set forth and claimed in my Patent No. 1,362,212, December 14, 1920, for combustion apparatus.

For practising the present process in the conversion of sodium sulfate to sodium oxid, the secondary combustion process of my application Serial No. 281,037, and the apparatus of my Patent No. 1,362,212 for carrying on a secondary combustion may be employed.

The secondary and primary combustion processes being fully set forth in my said application Serial No. 281,037 and the apparatus in Patent No. 1,362,212, further explanation thereof, except as hereinafter explained, is unnecessary.

In the accompanying drawing,

Figure 1 is a side elevation of a rotary furnace or kiln equipped with primary and secondary combustion chambers, constituting an apparatus adapted for practising my process;

Fig. 2 is a vertical section through the primary and secondary combustion chambers on the line 2—2 of Fig. 1;

Fig. 3 is a section on the line 3—3 of Fig. 1;

Fig. 4 is a horizontal section on the line 4—4 of Fig. 2, showing the relative arrangement of the fuel and air jets or sprays and their interplay in effecting combustion;

Fig. 5 is a detail section showing one of the fuel supplying nozzles; and

Fig. 6 is a similar view of one of the refractory air distributing tubes.

The apparatus illustrated in the drawings is particularly adapted for the practice of the process in converting sodium sulfate to sodium sulfid or sodium sulfate to sodium oxid. The rotary kiln or furnace 78 is of a well-known form and receives the material in any suitable manner as, for instance, through a feed chute or hopper 79. The chimney for the furnace is shown at 80. The primary combustion chamber appears at 81 and secondary combustion chamber is shown at 82. The fuel is jetted or sprayed into the combustion chamber 81 by nozzles or other suitable means 83, under suitable valve control 84. A form of nozzle adapted for this purpose is shown in Fig. 5, the same being suitably set in the wall of the combustion chamber. The air is jetted or sprayed from air distributers 15 in the chamber 81 under suitable valve control 85. The air distributers are in the form of refractory nozzles or tubes having perforations 17 and are suitably set in the wall of the chamber, as shown in Fig. 6.

The play of the finely divided fuel delivered within the combustion chamber 81 and the air jets issuing from the distributers 15 is such that the fuel, for instance, liquid hydrocarbon, is jetted or sprayed in finely divided form into and through the numerous air jets which issue from the perforations 17. The cross play of the finely divided fuel jets and the direction of play of the air jets is at an angle, preferably nearly a right angle, to the direction of final travel of the gases derived from combustion as they flow toward their point of utilization in the rotary kiln or furnace 78.

As fully explained in my applications heretofore specified, the cross play and interaction of the fuel and oxygen derived from the air jets results in not only the exterior of the body or mass of flame derived from combustion being converted into $CO_2$ in the chamber 81, but also, the entire interior of the mass or body of flame is thus converted. The staggered relationship of the rows of air distributers 15 to the fuel distributing nozzles 83 insures that the air issuing from the perforations 17 of each air distributer 15 will form a complete admixture with the jetted or sprayed fuel from the nozzles.

In the combustion chamber 82 the fuel is introduced by nozzles 86 under valve control 87, said nozzles being similar to the showing of Fig. 5. The air is introduced at 88 under valve control 89, the purpose being to provide excess carbon in the chamber 82 to carry out the secondary combustion process in said chamber 82 and to produce CO gas. The direction of play of the air and fuel in relation to each other and to the path of final travel of the CO gas evolved from combustion in the chamber 82 is the same as in the chamber 81.

A collar or hood 90 surrounds the delivery end of the furnace or kiln 78 and has a suitable outlet 91 for the sodium sulfid. A flue or outlet 92 directs the $CO_2$ gases from the combustion chamber 81 into the delivery end of the rotary furnace 78 to the point designated "$CO_2$," Figs. 1 and 3. A flue or outlet 93 directs the CO gases from the combustion chamber 82 into the rotary furnace or kiln 78 in the general region designated "CO," Figs. 1 and 3.

In the production of sodium sulfid, from sodium sulfate the chemical reactions occur at about 960° C., at which temperature the product becomes soft and pasty, permitting conversion. This conversion can only be accomplished in the presence of excess carbon in the gases and not in an oxidizing or neutral atmosphere. Care should be taken that the temperatures do not rise above the point indicated as the product would rapidly fuse and adhere to the furnace lining, forming sodium silicate, if the temperatures go up.

In practising my process the CO gases from the secondary chamber 82 discharge in close contact along the line and on top of the advancing charge of material as indicated at "CO." This occurs when the material has reached the temperature necessary to effect conversion, the revolutions of the furnace 78 constantly turning the material over and exposing all portions of the mass to the action of the reducing gases. The conversion of the product from sodium sulfate to sodium sulfid is almost instantaneous when contact is had with the carbon in the gases at proper temperatures. The constant discharge of the converted material makes the conversion process practically automatic and continuous.

The combustion process practised in the upper or main chamber 81 furnishes $CO_2$ gas to the interior of the rotary furnace 78 as indicated "$CO_2$," affording the heat required for the radiation from the walls of the furnace 78. The automatic and continuous process thus carried on, results in a high class product of sodium sulfid and obviates two troublesome and expensive steps heretofore necessary, towit: leaching of the roasted product, decanting and settling the liquors; and secondly, evaporation of the liquid solutions of the finished commercial product.

While I have illustrated certain applications of my primary and secondary combustion processes, this is done by way of illustration of the scope of the invention and not in limitation thereof, as many other applications of the process may be had, among which are the conversion of sodium sulfate into sodium oxid where lime is added, and the manufacture of Portland cement, in kilns such as shown in Figs. 1 and 3, and in the manufacture of glass in glass furnaces.

In the production of sodium oxid from sodium sulfate, the secondary, or CO combustion, is not used. The gases from the $CO_2$ chamber are so regulated that the complete combustion of the fuel for the purpose of liberating substantially all the heat units is carried on and so regulated that an excess of oxygen is present in the kiln. In this case, lime is added and the following reactions occur: the sulfur in the sodium sulfate leaves the sodium and combines with the lime for it has a greater affinity and forms calcium sulfid, the excess oxygen furnished the $CO_2$ gases being present in sufficient quantities to unite with the sodium to form sodium oxid.

My processes enable perfect regulation of fuel and air to meet conditions required in the application of the process to any installation.

What I claim is:—

1. A process for the conversion of sodium sulfate to sodium sulfid consisting of the submission of sodium sulfate to the direct action of CO gases when at a temperature at which conversion may occur.

2. A process for the conversion of sodium sulfate to sodium sulfid, consisting in the submission of sodium sulfate to the direct and joint action of CO and $CO_2$ gases at a temperature at which conversion may occur.

3. A process for the continuous conversion of sodium sulfate to sodium sulfid, consisting in continuous shifting and advancing the sodium sulfate in a rotary furnace or kiln while maintaining a suitable temperature for conversion of the material into sodium sulfid by $CO_2$ gases directly introduced into the kiln, and subjecting the shifting and advancing material to the direct action of CO gases.

In testimony whereof I affix my signature.

ROBERT JAMES ANDERSON.